(12) United States Patent
Narita

(10) Patent No.: US 11,179,858 B2
(45) Date of Patent: Nov. 23, 2021

(54) ROBOT ARM

(71) Applicant: TOYOTA JIDOSHA KABUSHIKI KAISHA, Toyota (JP)

(72) Inventor: Hideo Narita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 16/525,710

(22) Filed: Jul. 30, 2019

(65) Prior Publication Data

US 2020/0078963 A1 Mar. 12, 2020

(30) Foreign Application Priority Data

Sep. 7, 2018 (JP) .............................. JP2018-167619

(51) Int. Cl.
*B25J 19/00* (2006.01)
*B25J 9/10* (2006.01)
(Continued)

(52) U.S. Cl.
CPC ............. *B25J 19/0062* (2013.01); *B25J 9/10* (2013.01); *B25J 17/00* (2013.01); *B25J 18/00* (2013.01);
(Continued)

(58) Field of Classification Search
CPC ...... B25J 19/0062; B25J 19/0054; B25J 9/10; B25J 17/00; B25J 18/00; F16N 7/40; F16N 13/16; F16N 13/20; F16N 19/00; F16N 39/06; F16N 2013/205; F16N 2210/12; F16N 3/02; F16N 3/08; F16N 7/16; F16N 7/36; F16N 7/366; F16N 9/02; F16N 31/00; F16N 31/02; F04C 29/025; F16H 57/042; F16H 57/0426; F16H 57/0428;
(Continued)

(56) References Cited

U.S. PATENT DOCUMENTS 2,793,752 A * 5/1957 Kenneth ................ B01D 29/90
210/130
3,240,346 A * 3/1966 Callahan, Jr. .......... B01D 29/33
210/448
(Continued)

FOREIGN PATENT DOCUMENTS

GB 272044 A * 6/1927 ............... F16N 7/36
JP 2004-27997 A 1/2004
(Continued)

*Primary Examiner* — Jake Cook
*Assistant Examiner* — T. Scott Fix
(74) *Attorney, Agent, or Firm* — Sughrue Mion, PLLC

(57) ABSTRACT

A robot arm with high productivity capable of preventing a decelerator from being damaged is provided. A robot arm according to an embodiment of the present disclosure is a robot arm in which a second member is rotationally coupled to a first member via a decelerator that accommodates lubricant therein, the robot arm including: a circulation path in which the lubricant is circulated via the decelerator; a storage part that is arranged in the circulation path and stores the lubricant; and an actuator configured to circulate the lubricant, in which the storage part is provided with a filter for capturing impurities in the lubricant in such a way that the filter covers an outlet of the lubricant in the storage part.

8 Claims, 12 Drawing Sheets

(51) Int. Cl.
  *B25J 17/00* (2006.01)
  *B25J 18/00* (2006.01)
  *F16N 7/40* (2006.01)
  *F16N 13/20* (2006.01)
  *F16N 13/16* (2006.01)
  *F16N 19/00* (2006.01)
  *F16N 39/06* (2006.01)

(52) U.S. Cl.
  CPC ............... *F16N 7/40* (2013.01); *F16N 13/16* (2013.01); *F16N 13/20* (2013.01); *F16N 19/00* (2013.01); *F16N 39/06* (2013.01); *F16N 2013/205* (2013.01); *F16N 2210/12* (2013.01)

(58) Field of Classification Search
  CPC ...... F16H 57/0404; F15B 7/005; F15B 7/006; F16D 31/02; F16D 31/04; F16D 31/06; F01M 11/03
  USPC ...................................................... 74/490.05
  See application file for complete search history.

(56) References Cited

U.S. PATENT DOCUMENTS

| | | | | |
|---|---|---|---|---|
| 4,638,724 | A | * | 1/1987 | Emmert ................. B23Q 3/082 92/84 |
| 6,701,220 | B1 | * | 3/2004 | Lundstrom .............. B25J 9/102 318/562 |
| 8,282,825 | B2 | * | 10/2012 | Kent ...................... B01D 29/15 210/248 |
| 2005/0235638 | A1 | * | 10/2005 | Segerljung ................ B66F 9/22 60/445 |
| 2006/0219620 | A1 | | 10/2006 | Suga |
| 2010/0154579 | A1 | * | 6/2010 | Nakamura ........... B25J 19/0054 74/490.05 |
| 2013/0125691 | A1 | * | 5/2013 | Wappling ............ F16H 57/0406 74/467 |
| 2014/0091023 | A1 | * | 4/2014 | Long ........................ F16N 7/36 210/167.08 |
| 2017/0368656 | A1 | * | 12/2017 | Hugel ................... B23Q 11/121 |
| 2019/0195333 | A1 | * | 6/2019 | Uemura ................ B25J 19/0062 |
| 2019/0264795 | A1 | * | 8/2019 | Nakayama .............. F16K 17/06 |

FOREIGN PATENT DOCUMENTS

| | | |
|---|---|---|
| JP | 2006-283617 A | 10/2006 |
| JP | 2012-161887 A | 8/2012 |
| JP | 2015-28368 A | 2/2015 |

* cited by examiner

ROBOT ARM

CROSS REFERENCE TO RELATED APPLICATIONS

This application is based upon and claims the benefit of priority from Japanese patent application No. 2018-167619, filed on Sep. 7, 2018, the disclosure of which is incorporated herein in its entirety by reference.

BACKGROUND

The present disclosure relates to a robot arm, and relates to, for example, a robot arm in which a second member is rotationally coupled to a first member via a decelerator that accommodates lubricant therein.

Typical robot arms have a structure in which a second member is rotationally coupled to a first member via a decelerator and lubricant is enclosed inside the decelerator. A robot arm disclosed in Japanese Unexamined Patent Application Publication No. 2012-161887 includes a tube member for releasing lubricant when the pressure inside a decelerator that couples a first member and a second member is increased, and this tube member includes a spiral part that surrounds a motor provided in a housing of the first member. As described above, since the robot arm disclosed in Japanese Unexamined Patent Application Publication No. 2012-161887 includes the spiral part in the tube member, this robot arm is able to accommodate a large amount of lubricant that overflows from the inside of the decelerator.

SUMMARY

The applicant has found the following problem. Lubricant of typical robot arms needs to be replaced with a new one since an amount of impurities in the lubricant increases in accordance with an operation of the robot arm. At this time, the robot arm needs to be stopped, which causes a problem that productivity is reduced. On the other hand, if the lubricant continues to be used without being replaced, it is possible that the decelerator may be damaged.

The present disclosure has been made in view of the aforementioned problem, and provides a robot arm with high productivity capable of preventing the decelerator from being damaged.

A robot arm according to one aspect of the present disclosure is a robot arm in which a second member is rotationally coupled to a first member via a decelerator that accommodates lubricant therein, the robot arm including:

a circulation path in which the lubricant is circulated via the decelerator;

a storage part that is arranged in the circulation path and stores the lubricant; and an actuator configured to circulate the lubricant, in which the storage part is provided with a filter for capturing impurities in the lubricant in such a way that the filter covers an outlet of the lubricant in the storage part.

According to the above structure, it is possible to capture the impurities in the lubricant. Therefore, it is possible to prevent the lubricant from being degraded and to reduce the frequency of the replacement of the lubricant with a new one. As a result, it is possible to reduce the stop time for replacing the lubricant with a new one and to improve productivity of the robot arm. In addition, by circulating the lubricant, it is possible to distribute the lubricant between gears of the decelerator, whereby it is possible to prevent the decelerator from being damaged.

In the aforementioned robot arm, the outlet of the lubricant in the storage part is preferably formed in an end part on a side opposite to a gravity direction in the storage part, and the filter is preferably fixed to the end part on the side opposite to the gravity direction in the storage part in such a way that the filter covers the outlet from an inside direction of the storage part.

According to the above structure, it is possible to precipitate the impurities captured by the filter in the bottom part of the storage part while the robot arm is being stopped.

In the aforementioned robot arm, the actuator preferably pushes out the lubricant using the rotation of the second member with respect to the first member as a drive source.

According to the above structure, a drive source such as a dedicated motor for circulating the lubricant is not required, whereby it is possible to prevent the size of the robot arm from being increased.

In the aforementioned robot arm, the actuator preferably includes a screw pump that pushes out the lubricant, a screw included in the screw pump being rotated using the rotation of the second member with respect to the first member as a drive source.

According to the above structure, a drive source such as a dedicated motor for circulating the lubricant is not required, whereby it is possible to prevent the size of the robot arm from being increased.

In the aforementioned robot arm, the actuator preferably includes a ratchet mechanism that transmits one rotation of the second member with respect to the first member to the screw and interrupts transmission of another rotation of the second member with respect to the first member to the screw.

According to the above structure, it is possible to prevent the lubricant from flowing back inside the circulation path.

In the aforementioned robot arm, the actuator preferably includes a piston pump that pushes out the lubricant, a piston included in the piston pump moving using the rotation of the second member with respect to the first member as a drive source.

According to the above structure, a drive source such as a dedicated motor for circulating the lubricant is not required, whereby it is possible to prevent the size of the robot arm from being increased.

In the aforementioned robot arm,
the actuator preferably includes:
a through-hole that penetrates through the piston; and
a valve mechanism configured to open the through-hole when the second member is rotated in one direction with respect to the first member and the piston is moved and to block the through-hole when the second member is rotated in another direction with respect to the first member and the piston is moved.

According to the above structure, it is possible to prevent the lubricant from flowing back inside the circulation path.

In the aforementioned robot arm,
the piston pump preferably includes a cylinder that accommodates the piston in such a way the piston can be moved and is arranged in the circulation path, and a rod having one end part fixed to the piston and having another end part protruded from the cylinder, the cylinder being fixed to the first member,
the actuator preferably includes:
a rotation transmission part that is rotated about a rotation axis of the second member when the second member is rotated with respect to the first member and includes one of a convex part and a concave part; and a rotated transmission part that is fixed to the other end part of the rod and includes the other one of the convex part and the concave part with which the rotation transmission part is engaged, and the convex part preferably falls out of the concave part when the rotation of the second member with respect to the first member falls outside a predetermined rotation range.

According to the above structure, it is possible to prevent the piston pump from being damaged.

The aforementioned robot arm preferably includes:

a first base having a peripheral surface in which an arc surface is provided, the first base being the first member;

a second base that is rotationally connected to the first base about a first axis that passes the center of the arc surface of the first base, the second base being the second member;

an arm part connected to the second base in such a way that it can be rotated about a second axis perpendicular to the first axis;

a first actuator that includes a screw pump fixed to the second base and a roller that is connected to the screw pump and contacts an arc surface of the first base, the first actuator being capable of transmitting the rotation of the second base with respect to the first base to the screw pump via the roller;

a second actuator that includes a piston pump fixed to the second base, a rotation transmission part that is fixed to the arm part and includes one of a convex part and a concave part, and a rotated transmission part that is fixed to a tip end part of a rod of the piston pump and includes the other one of the convex part and the concave part that can be engaged with the rotation transmission part, the second actuator being capable of transmitting the rotation of the arm part with respect to the second base to the piston pump via the rotation transmission part and the rotated transmission part, in which the second base is preferably provided with a first motor and a first decelerator for rotating the second base with respect to the first base and a second motor and a second decelerator for rotating the arm part with respect to the second base.

According to the above structure, the first actuator or the second actuator is appropriately selected in accordance with the rotation range of the second base with respect to the first base and the rotation range of the arm part with respect to the second base. Therefore, it is possible to definitely circulate the lubricant of the first and second decelerators.

According to the present disclosure, it is possible to provide a robot arm with high productivity capable of preventing the decelerator from being damaged.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, a specific embodiment to which the present disclosure is applied will be described in detail. However, the present disclosure is not limited to the following embodiment. Further, for the sake of clarification of the description, the following descriptions and the drawings are simplified as appropriate.

Figure 1:
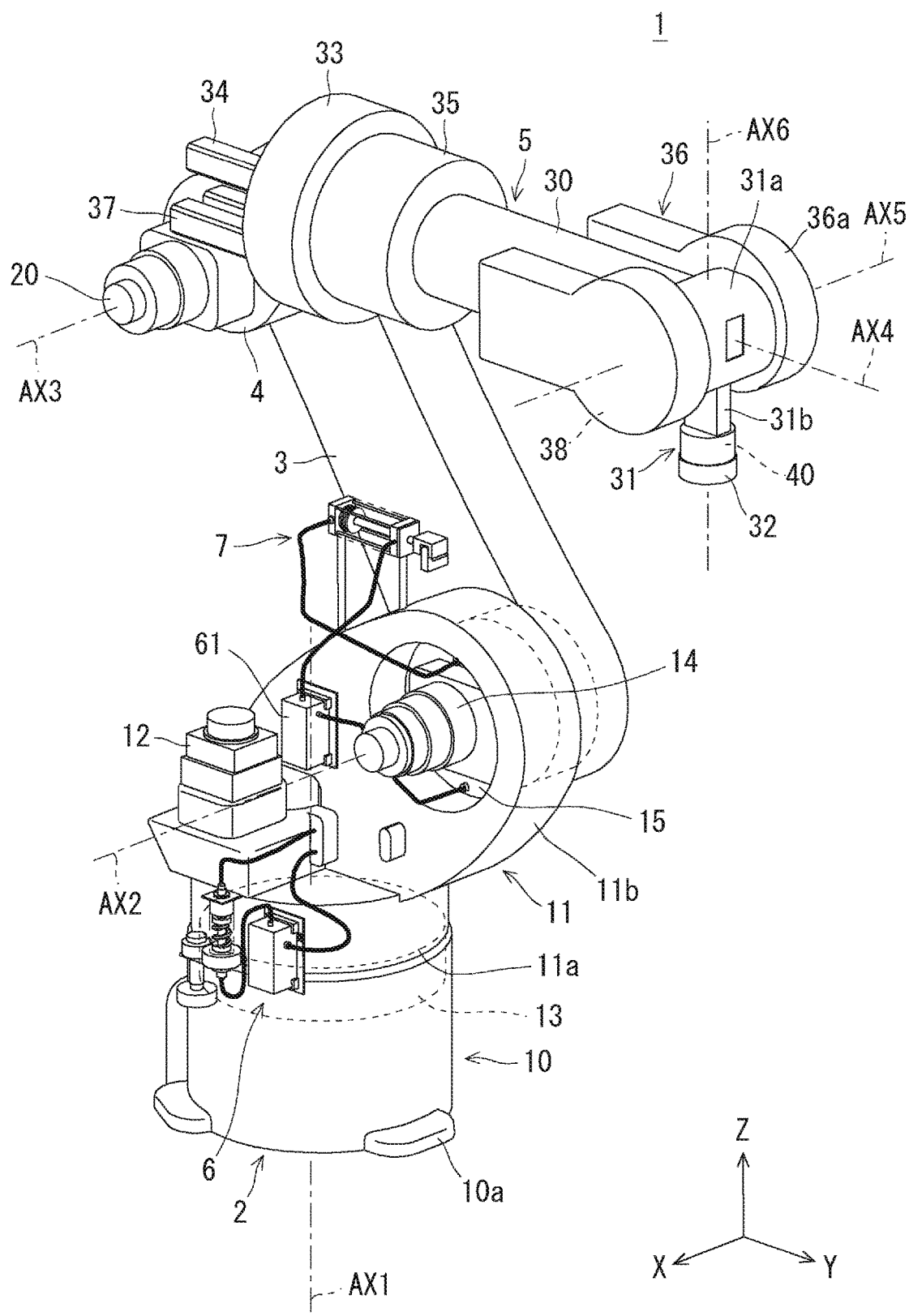
FIG. 1 is a perspective view schematically showing a robot arm according to an embodiment.
Figure 2:
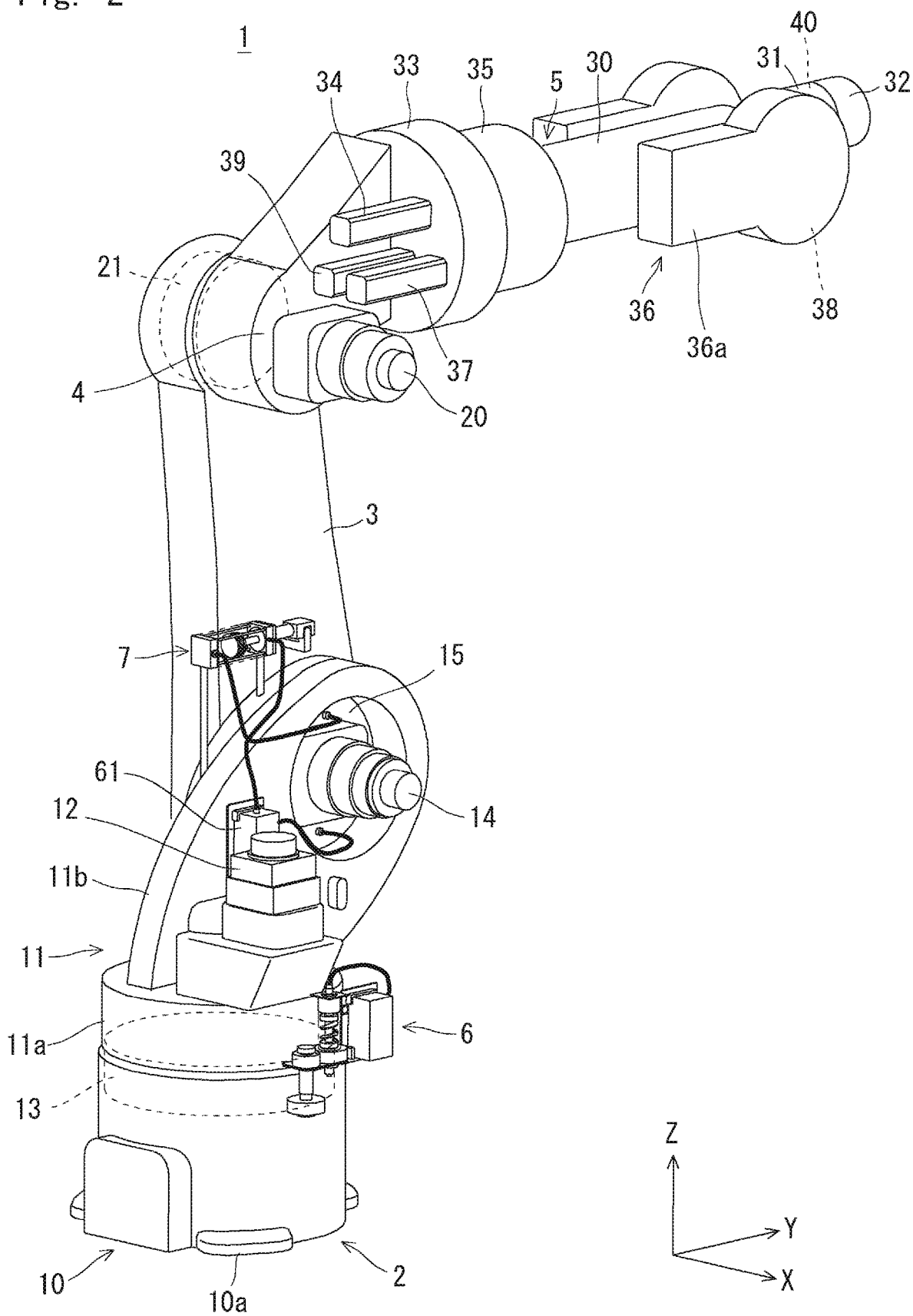
FIG. 2 is another perspective view schematically showing the robot arm according to the embodiment.

First, a structure of a robot arm according to this embodiment will be explained. FIG. 1 is a perspective view schematically showing the robot arm according to this embodiment. FIG. 2 is another perspective view schematically showing the robot arm according to this embodiment. In FIGS. 1 and 2, some of the elements are shown in a perspective manner so as to make clear the structure of the robot arm. In the following description, the structure of the robot arm in the state shown in FIG. 1 is described using a three-dimensional (XYZ) coordinate system. At this time, the Z-axis negative direction corresponds to the gravity direction.

A robot arm 1, which is, for example, a six-axis articulated robot, includes a base part 2, a first arm part 3, a second arm part 4, a wrist mechanism 5, a first circulation mechanism 6, and a second circulation mechanism 7, as shown in FIGS. 1 and 2. The base part 2 includes a first base 10 and a second base 11.

The first base 10 has a columnar shape that is extended in the Z-axis direction as a basic form. That is, at least the peripheral surface of the part of the first base 10 on the Z-axis positive side is a circumferential surface. Therefore, the part of the first base 10 on the Z-axis positive side has a circular shape when it is seen from the Z-axis direction. Then the first base 10 includes a connected part 10a in the end part of the first base 10 on the Z-axis negative side.

The aforementioned first base 10 is placed, for example, on the floor, and is fixed to the floor by connecting the connected part 10a to the floor. The position where the first base 10 is fixed is not limited to the floor and may be a wall or ceiling.

The second base 11 is arranged on the Z-axis positive side with respect to the first base 10. The second base 11 includes a turning part 11a and a fixed arm 11b. The turning part 11a has, for example, a disc shape having a dimension substantially equal to that of the first base 10 as a basic form when it is seen from the Z-axis direction.

The fixed arm 11b is protruded in the Z-axis positive side from the surface of the turning part 11a on the Z-axis positive side. The fixed arm 11b has, for example, a flat shape in which the surfaces facing each other in the X-axis direction are arranged substantially parallel to each other, and a root part of the fixed arm 11b is fixed to the surface of the turning part 11a on the Z-axis positive side. The tip end part of the fixed arm 11b has a roughly arcuate shape when it is seen from the X-axis direction.

The aforementioned second base 11 is connected to the first base 10 in such a way that it can be turned (rotated) about a first axis AX1 that passes the center of the first base 10 and is extended in the Z-axis direction. That is, the center of the turning part 11a of the second base 11 is roughly arranged on the first axis AX1. At this time, the second base 11 is preferably provided with a first motor 12 and a first decelerator 13 for rotating the second base 11 with respect to the first base 10.

An input axis of the first decelerator 13 is connected to a rotation axis of the first motor 12 and an output axis of the first decelerator 13 is connected to the first base 10. Accordingly, when the first motor 12 is driven, the second base 11 can be rotated along with the first motor 12 and the first decelerator 13 about the first axis AX1 with respect to the first base 10.

The first arm part 3 is connected to the tip end part of the fixed arm 11b of the base part 2 in such a way that it can be rotated about a second axis AX2 that is extended in the X-axis direction (i.e., extended in a direction substantially perpendicular to the first axis AX1). The first arm part 3 has, for example, a flat shape in which the surfaces facing each other in the X-axis direction are arranged in parallel to each other, and one end part of the first arm part 3 is connected to the tip end part of the fixed arm 11b of the base part 2.

At this time, the tip end part of the fixed arm 11b of the base part 2 is preferably provided with a second motor 14 and a second decelerator 15 for rotating the first arm part 3 with respect to the second base 11 of the base part 2.

An input axis of the second decelerator 15 is connected to a rotation axis of the second motor 14, and an output axis of the second decelerator 15 is connected to one end part of the first arm part 3. Accordingly, when the second motor 14 is driven, the first arm part 3 can be rotated with respect to the base part 2 about the second axis AX2.

The second arm part 4 is connected to the other end part of the first arm part 3 in such a way that it can be rotated about a third axis AX3 that is extended in the X-axis direction (i.e., arranged so as to be substantially parallel to the second axis AX2). The second arm part 4 has, for example, a flat shape in which the surfaces facing each other in the X-axis direction are arranged in parallel to each other, and one end part of the second arm part 4 is connected to the other end part of the first arm part 3.

At this time, the other end part of the first arm part 3 is provided with, for example, a third motor 20 and a third decelerator 21 for rotating the second arm part 4 with respect to the first arm part 3.

An input axis of the third decelerator 21 is connected to a rotation axis of the third motor 20, and an output axis of the third decelerator 21 is connected to one end part of the second arm part 4. Accordingly, when the third motor 20 is driven, the second arm part 4 can be rotated with respect to the first arm apart 3 about the third axis AX3.

The wrist mechanism 5 is connected to the other end part of the second arm part 4. The wrist mechanism 5 includes a first arm 30, a second arm 31, and a third arm 32. The first arm 30 has, for example, a cylindrical shape as a basic form, and is extended in the Y-axis direction (i.e., a direction in which a fourth axis AX4 that is perpendicular to the third axis AX3 is extended). Then one end part of the first arm 30 is connected to the other end part of the second arm part 4 via a first connection part 33 in such a way that the first arm 30 can be rotated about the fourth axis AX4.

The first connection part 33 is protruded, for example, in the X-axis direction (i.e., a direction in which the third axis AX3 is extended) from the other end part of the second arm part 4, and has a cylindrical shape penetrating in the Y-axis direction. A fourth motor 34 and a fourth decelerator 35 for rotating the first arm 30 of the wrist mechanism 5 with respect to the second arm part 4 are fixed inside the above first connection part 33.

An input axis of the fourth decelerator 35 is connected to a rotation axis of the fourth motor 34 via a drive transmission mechanism such as a gear train accommodated inside the first connection part 33, and an output axis of the fourth decelerator 35 is connected to one end part of the first arm 30 of the wrist mechanism 5. Accordingly, when the fourth motor 34 is driven, the first arm 30 of the wrist mechanism 5 can be rotated with respect to the second arm part 4 about the fourth axis AX4.

The second arm 31 is connected to the other end part of the first arm 30 via a second connection part 36 in such a way that it can be rotated about a fifth axis AX5 that is extended in the X-axis direction (i.e., perpendicular to the fourth axis AX4) with respect to the first arm 30.

The second connection part 36 is fixed to the other end part of the first arm 30, and has a form in which it is divided into two branches from the other end part of the first arm 30. The second connection part 36 includes, for example, a set of connection arms 36a. The connection arm 36a has, for example, a flat shape in which surfaces facing each other in the X-axis direction are arranged substantially parallel to each other, and has a hollow structure.

The aforementioned connection arm 36a is extended in the Y-axis direction, and one end part of the connection arm 36a is fixed to the other end part of the first arm 30. Then the set of connection arms 36a are arranged in such a way that they sandwich the first arm 30 in the X-axis direction.

The second arm 31 has, for example, a substantially T shape when it is seen from the Y-axis direction, and includes a first part 31a that is extended in the X-axis direction (i.e., a direction in which the fifth axis AX5 is extended) and a second part 31b having a root part connected to the first part 31a.

The first part 31a is arranged between the set of connection arms 36a of the second connection part 36, and the end parts of the first part 31a are connected to the other end part of the connection arm 36a in such a way that it can be rotated about the fifth axis AX5.

At this time, for example, a fifth motor 37 for rotating the second arm 31 with respect to the first arm 30 is fixed inside the first connection part 33, and a fifth decelerator 38 is accommodated inside one connection arm 36a of the second connection part 36.

An input axis of the fifth decelerator 38 is connected to a rotation axis of the fifth motor 37 via a drive transmission mechanism such as a propeller shaft or a gear train provided inside the first connection part 33 and the second arm 31, and an output axis of the fifth decelerator 38 is connected to the first part 31a of the second arm 31. Accordingly, when the fifth motor 37 is driven, the second arm 31 can be rotated with respect to the first arm 30 about the fifth axis AX5.

The third arm 32 is connected to the tip end part of the second part 31b of the second arm 31 in such a way that it can be rotated about a sixth axis AX6 that is extended in the Z-axis direction with respect to the second arm 31 (i.e., perpendicular to the fifth axis AX5). A robot hand is, for example, connected to the third arm 32.

At this time, for example, a sixth motor 39 for rotating the third arm 32 with respect to the second arm 31 is fixed inside the first connection part 33, and a sixth decelerator 40 is accommodated inside the second part 31b of the second arm 31.

An input axis of the sixth decelerator 40 is connected to a rotation axis of the sixth motor 39 via a drive transmission mechanism such as a propeller shaft provided inside the first connection part 33 and the second arm 31 or a gear train accommodated in the other connection arm 36a of the second connection part 36, and an output axis of the sixth decelerator 40 is connected to the third arm 32. Accordingly, when the sixth motor 39 is driven, the third arm 32 can be rotated about the sixth axis AX6 with respect to the second arm 31.

Figure 3:
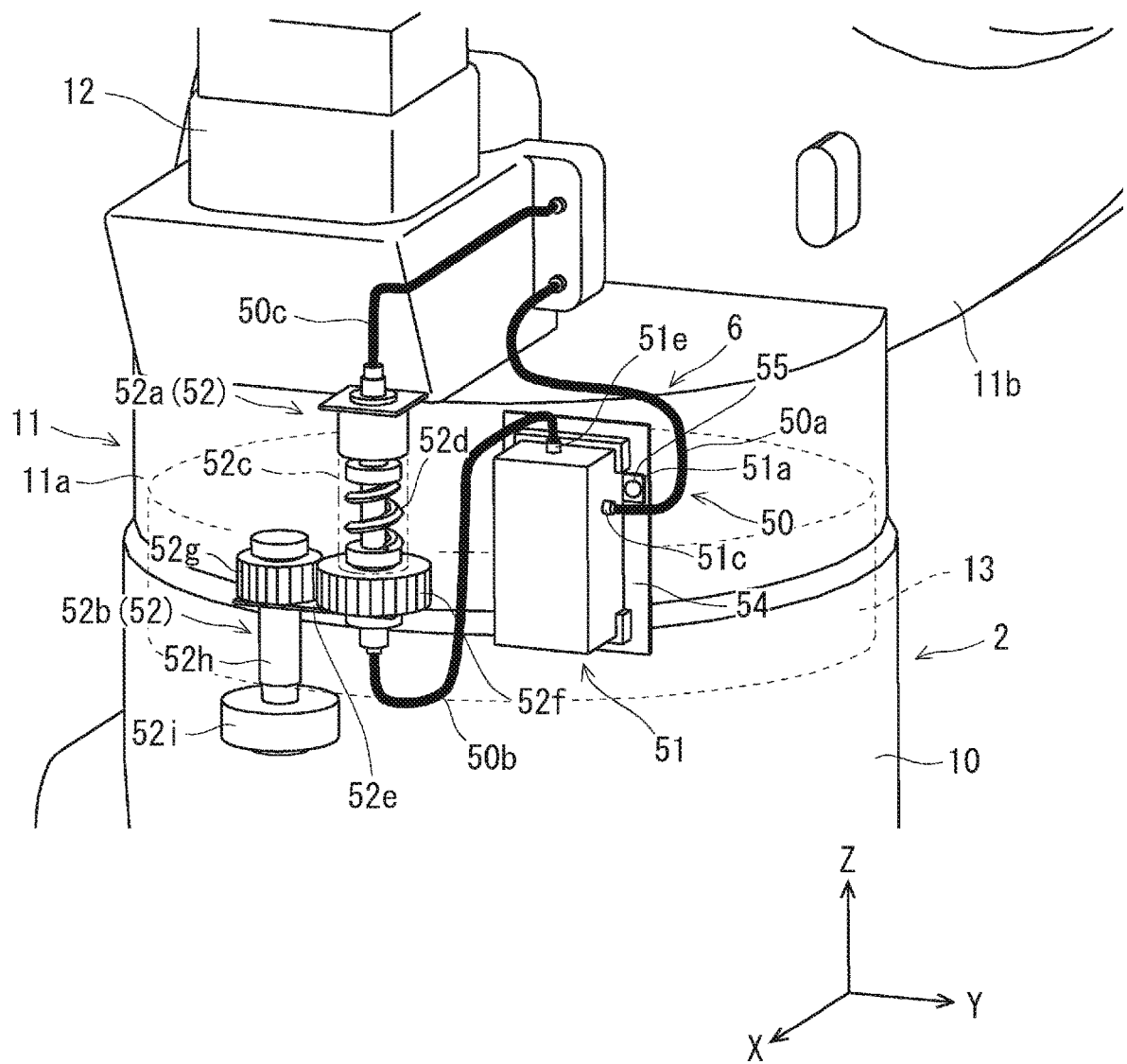
FIG. 3 is a perspective view showing a part in the vicinity of a first circulation mechanism in the robot arm according to the embodiment in an enlarged view.
Figure 4:
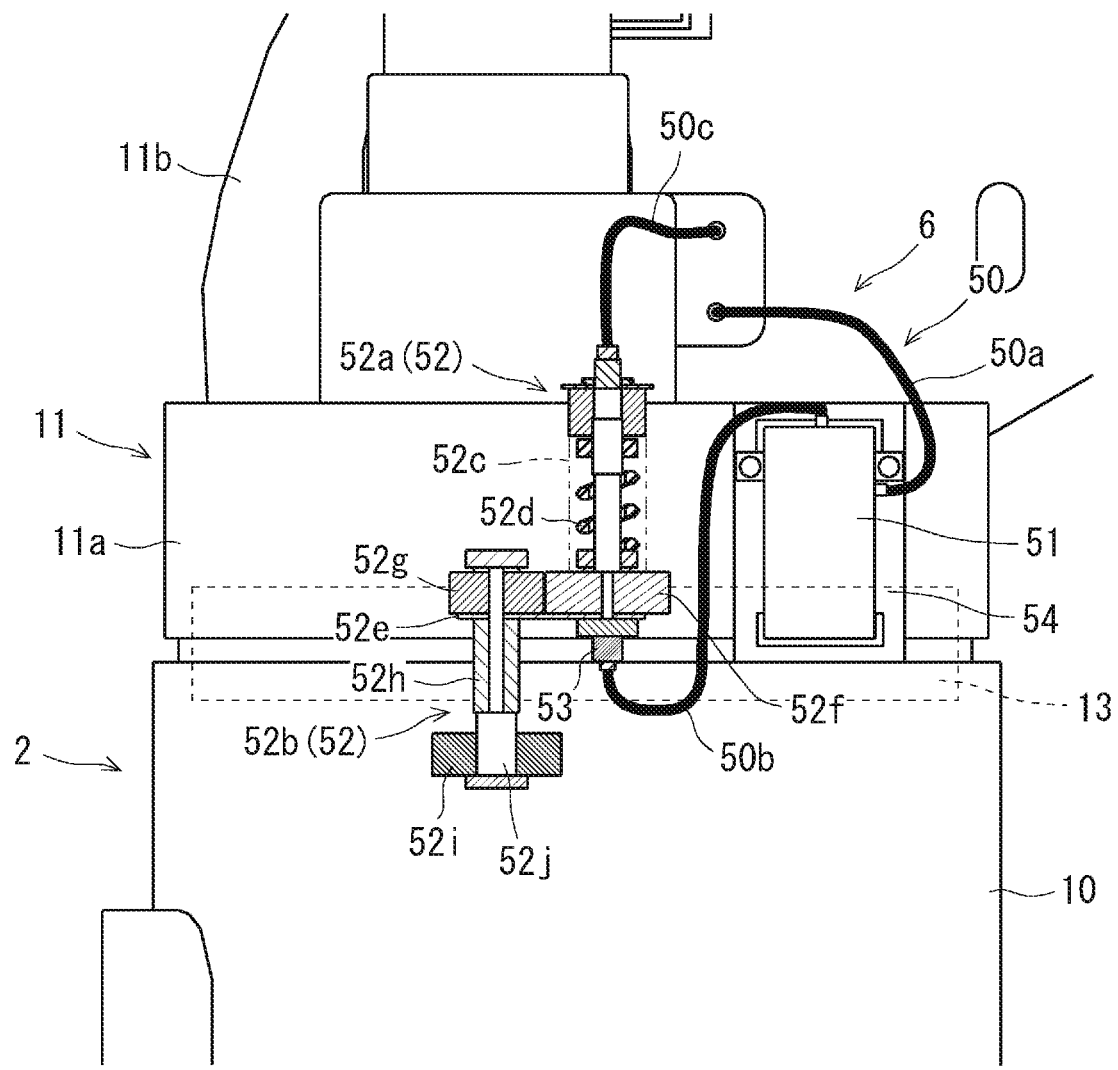
FIG. 4 is a cross-sectional view showing a first circulation mechanism in the robot arm according to the embodiment.
Figure 5:
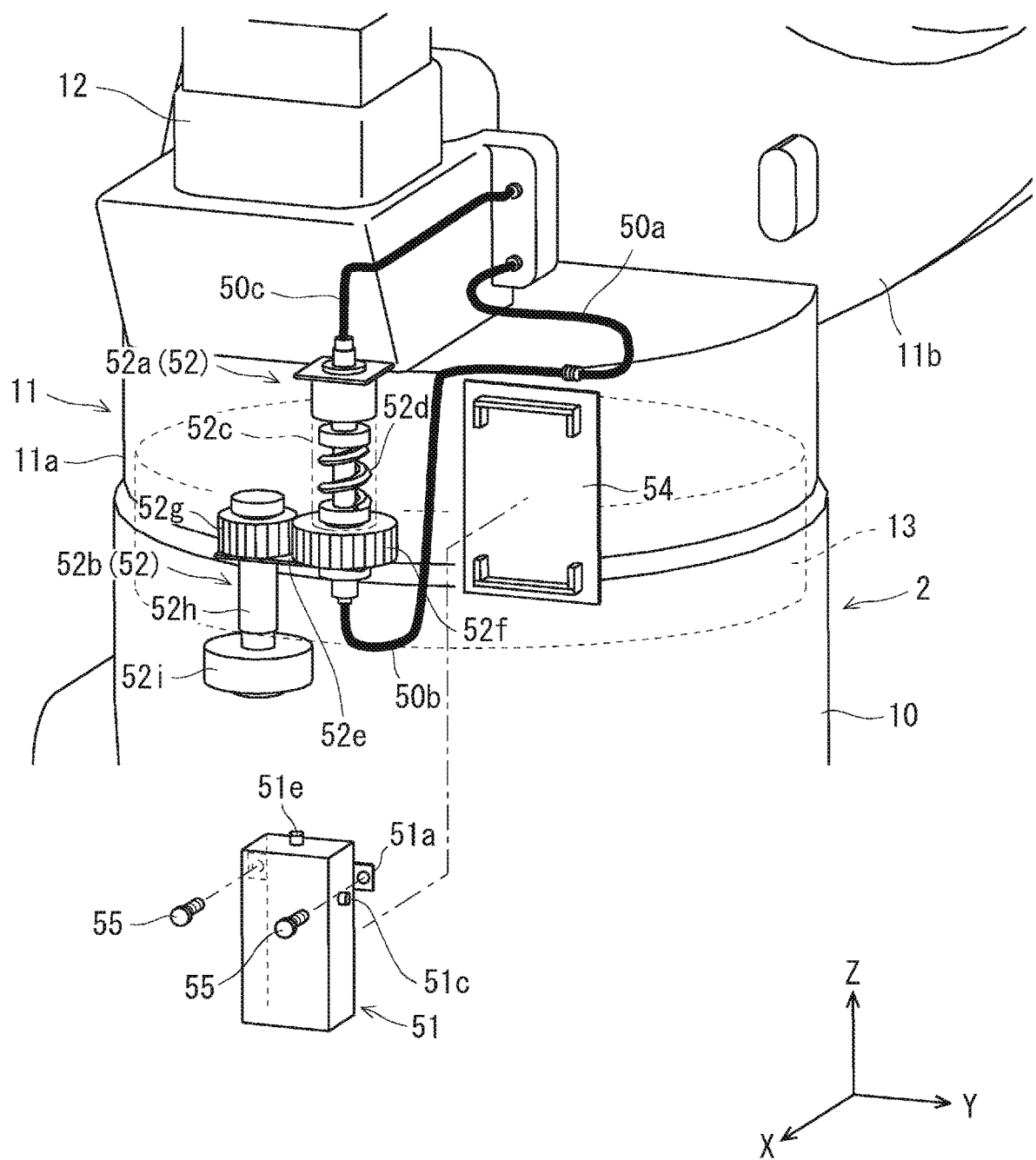
FIG. 5 is a perspective view showing a state in which a storage part in the robot arm according to the embodiment is detached from a second base of a base part.
Figure 6:
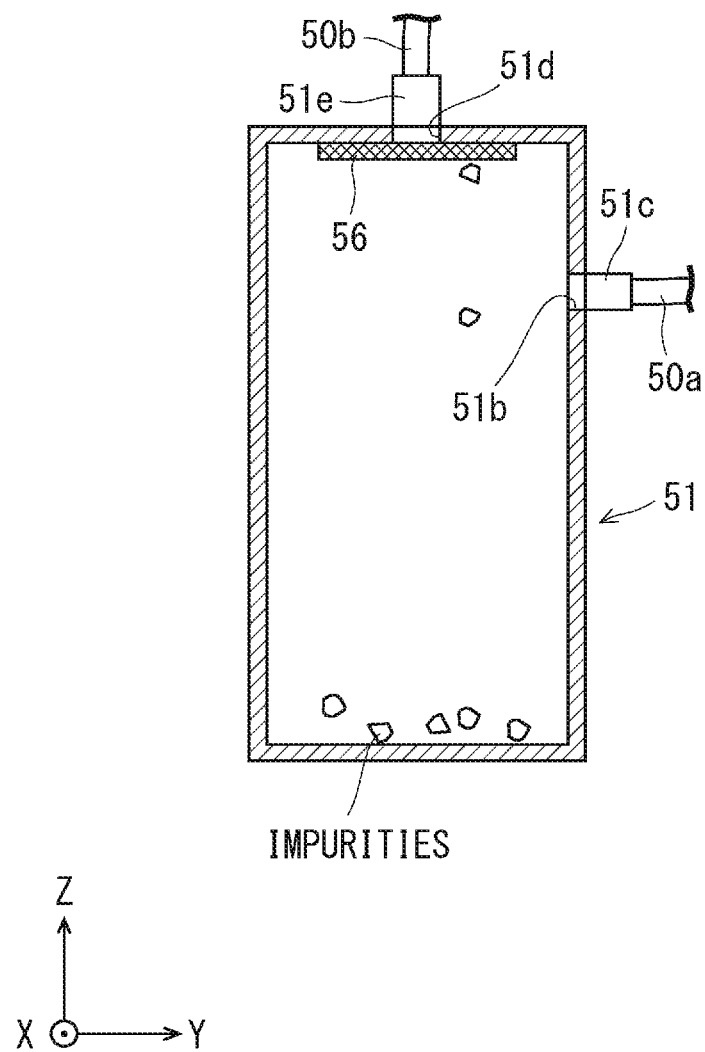
FIG. 6 is a partial cross-sectional view showing a structure of the storage part of the first circulation mechanism in the robot arm according to the embodiment.

The first circulation mechanism 6 circulates the lubricant accommodated inside the first decelerator 13. FIG. 3 is a perspective view showing a part in the vicinity of the first circulation mechanism in the robot arm according to this embodiment in an enlarged view. FIG. 4 is a cross-sectional view showing the first circulation mechanism in the robot arm according to this embodiment. FIG. 5 is a perspective view showing a state in which the storage part in the robot arm according to this embodiment is detached from the second base of the base part. FIG. 6 is a partial cross-sectional view showing a structure of the storage part of the first circulation mechanism in the robot arm according to this embodiment. In FIGS. 3 to 5, some of the members are shown in a perspective manner in such a way that the structure of the first circulation mechanism is made clear.

As shown in FIGS. 3 and 4, the first circulation mechanism 6 includes a circulation path 50, a storage part 51, and an actuator (first actuator) 52. The circulation path 50 is a closed circuit formed of the first decelerator 13, a first hose 50a, the storage part 51, a second hose 50b, the actuator 52, and a third hose 50c, and the circulation path 50 is filled with lubricant. The lubricant is typical grease, lubricating oil or the like.

One end part of the first hose 50a is connected to the first decelerator 13, and the other end part of the first hose 50a is connected to the storage part 51. One end part of the second hose 50b is connected to the storage part 51, and the other end part of the second hose 50b is connected to the actuator 52. One end part of the third hose 50c is connected to the actuator 52, and the other end part of the third hose 50c is connected to the first decelerator 13.

At this time, in order to prevent the first hose 50a, the second hose 50b, and the third hose 50c from being twisted, as shown in FIG. 4, an end part of each of the first hose 50a, the second hose 50b, and the third hose 50c may be equipped with a rotary coupling 53.

The storage part 51 stores the lubricant. The storage part 51 is fixed to the second base 11 of the base part 2 in such a way that it can be attached to or detached from the second base 11 of the base part 2. More specifically, the storage part 51 has, for example, a hollow box shape including a lid that can be opened and/or closed as a basic form, and includes a connected part 51a.

A connection plate 54 is fixed to a peripheral surface of the second base 11 of the base part 2, and the connected part 51a of the storage part 51 is attached to the connection plate 54 using a bolt 55, as shown in FIG. 3. On the other hand, when the bolt 55 is loosened, the storage part 51 can be detached from the second base 11 of the base part 2, as shown in FIG. 5.

As shown in FIG. 6, the storage part 51 includes a supply inlet 51b formed therein, and the other end part of the first hose 50a is connected to the supply inlet 51b via a first nipple 51c that is protruded from the storage part 51. At this time, the supply inlet 51b is preferably formed at a position higher than the center of the height of the storage part 51 in the Z-axis direction, while the detailed functions thereof will be explained later.

The storage part 51 further includes an outlet 51d formed therein, and one end part of the second hose 50b is connected to the outlet 51d via a second nipple 51e that is protruded from the storage part 51. At this time, the outlet 51d is preferably formed in an end part (i.e., ceiling part) of the storage part 51 on the Z-axis positive side, while the detailed functions thereof will be explained later.

As shown in FIG. 6, the storage part 51 is provided with a filter 56 for capturing impurities (e.g., iron powder) of the lubricant in such a way that it covers the outlet 51d. The filter 56 preferably includes, for example, a mesh member, and is fixed to the inner wall surface of the storage part 51 in such a way that it covers the outlet 51d from inside direction of the storage part 51. The mesh size of the filter 56 is preferably set as appropriate in accordance with the type of the lubricant.

The actuator 52 circulates the lubricant inside the circulation path 50. The actuator 52 includes a screw pump 52a and a drive transmission mechanism 52b. As shown in FIGS. 3 and 4, the screw pump 52a includes a screw 52d arranged inside a housing 52c in such a way that it can be rotated. At this time, the screw 52d is arranged, for example, in such a way that it is extended in the Z-axis direction.

A supply inlet is formed in the vicinity of the end part of the screw 52d in the housing 52c on the Z-axis negative side, and the other end part of the second hose 50b is connected to this supply inlet. Further, an outlet is formed in the vicinity of the end part of the screw 52d in the housing 52c on the Z-axis positive side, and one end part of the third hose 50c is connected to this outlet.

The above screw pump 52a is fixed to a peripheral surface of the second base 11 of the base part 2. As shown in FIG. 3, the screw pump 52a is supported, for example, in a state in which it is placed on a support board 52e that is protruded from the peripheral surface of the second base 11 of the base part 2. The support board 52e has, for example, a plate-like shape as a basic form.

The drive transmission mechanism 52b transmits rotation of the second base 11 with respect to the first base 10 to the screw 52d in order to use the rotation of the second base 11 with respect to the first base 10 of the base part 2 as a drive source of the screw pump 52a.

As shown in FIG. 4, the drive transmission mechanism 52b includes a first gear 52f, a second gear 52g, a transmission axis 52h, a roller 52i, and a ratchet mechanism 52j. The first gear 52f is, for example, a spur gear, and is fixed to the end part of the screw 52d on the Z-axis negative side. The second gear 52g is, for example, a spur gear, and is meshed with the first gear 52f.

As shown in FIG. 4, the transmission axis 52h is extended in the Z-axis direction, the second gear 52g is fixed to the end part of the transmission axis 52h on the Z-axis positive side, and the roller 52*i* is fixed to the end part of the transmission axis 52*h* on the Z-axis negative side via the ratchet mechanism 52*j*. Then the second gear 52*g*, the transmission axis 52*h*, the roller 52*i*, and the ratchet mechanism 52*j* are supported by the support board 52*e* in a state in which the transmission axis 52*h* is passed through a through-hole formed in the support board 52*e*. At this time, the second gear 52*g* is arranged on the Z-axis positive side with respect to the support board 52*e*, and the roller 52*i* is arranged on the Z-axis negative side with respect to the support board 52*e*.

The roller 52*i* contacts the circumferential surface of the first base 10 of the base part 2. At least the part of the first base 10 on the Z-axis positive side and the second base 11 have substantially equal circles when they are seen from the Z-axis direction. Therefore, when the second base 11 is rotated about the first axis AX1 with respect to the first base 10, the roller 52*i* is rotated along the circumferential surface of the first base 10.

The ratchet mechanism 52*j* transmits one rotation of the second base 11 with respect to the first base 10 of the base part 2 from the roller 52*i* to the transmission axis 52*h* and interrupts the transmission of the other rotation of the second base 11 with respect to the first base 10 from the roller 52*i* to the transmission axis 52*h* in such a way that the screw 52*d* is rotated only in the rotational direction in which the lubricant is sent to the outlet of the housing 52*c*. A general ratchet mechanism may be used as the ratchet mechanism 52*j*.

However, the structure of the drive transmission mechanism 52*b* is not limited to the above structure and the drive transmission mechanism 52*b* may have any structure as long as the drive transmission mechanism 52*b* enables the rotation of the second base 11 with respect to the first base 10 to be transmitted to the screw 52*d*.

Figure 7:
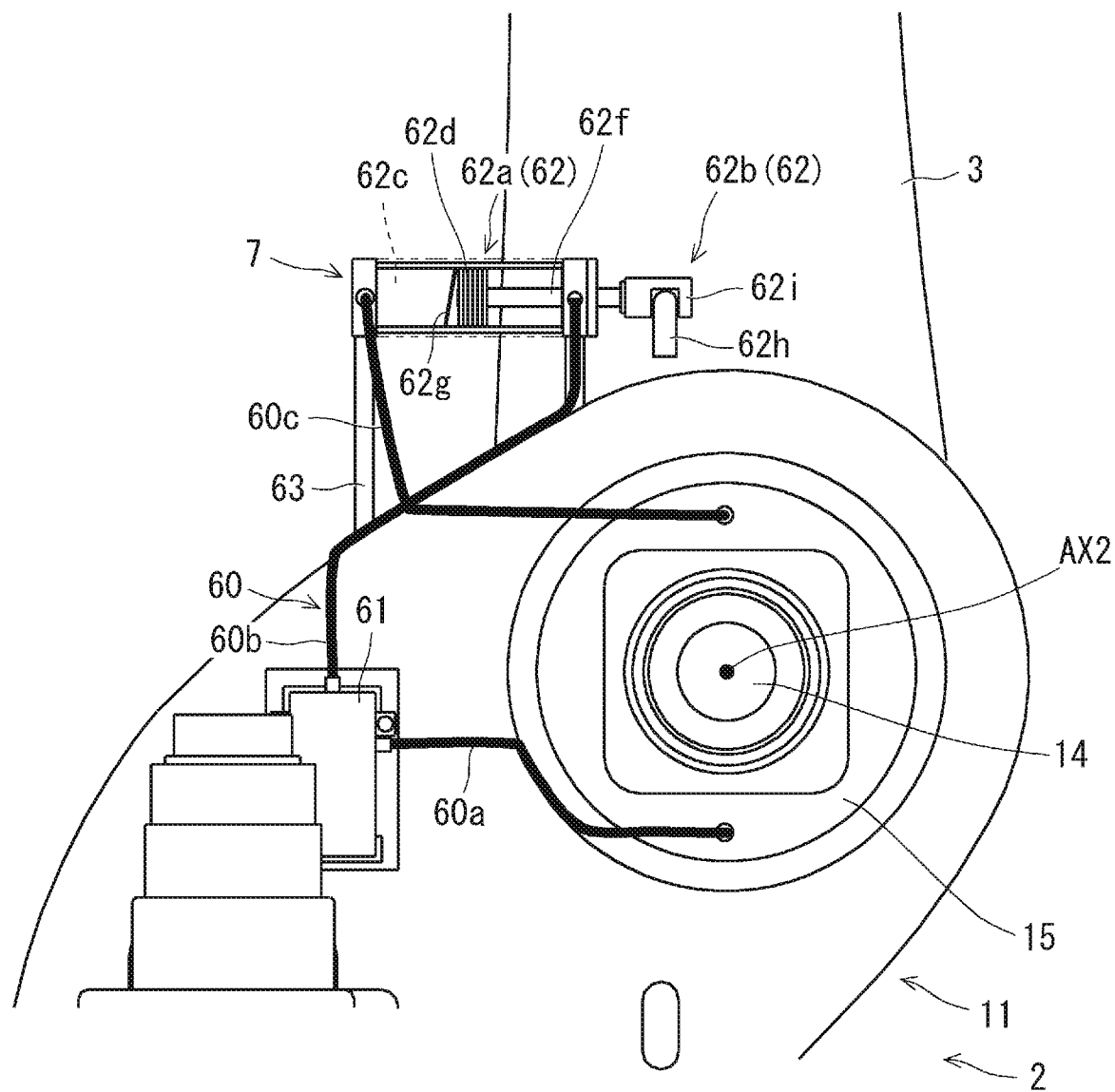
FIG. 7 is a front view showing a part in the vicinity of a second circulation mechanism in the robot arm according to the embodiment in an enlarged view.
Figure 8:
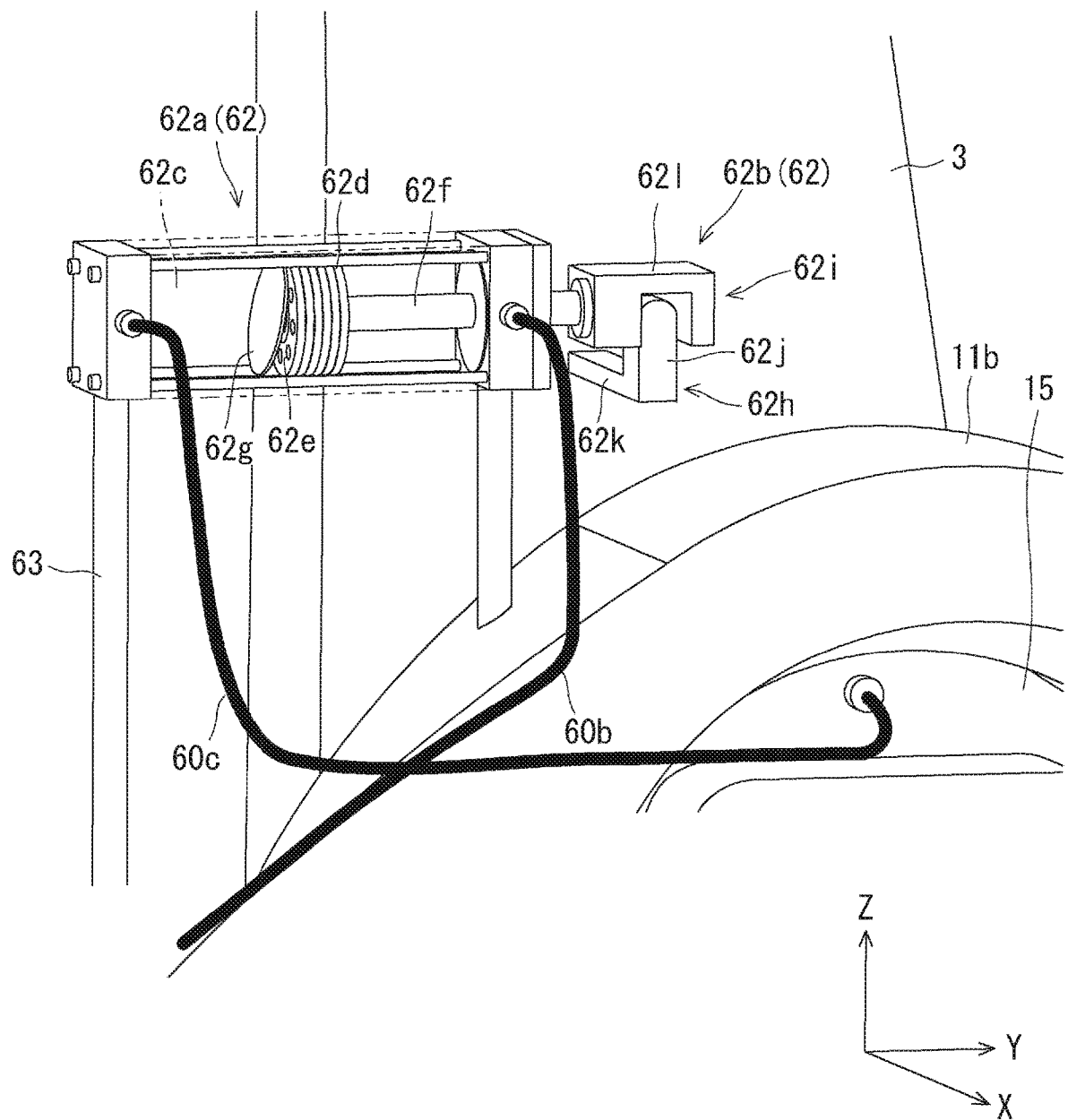
FIG. 8 is a perspective view showing a part in the vicinity of the second circulation mechanism in the robot arm according to the embodiment in an enlarged view.

The second circulation mechanism 7 circulates the lubricant of the second decelerator 15. FIG. 7 is a front view showing a part in the vicinity of the second circulation mechanism in the robot arm according to this embodiment in an enlarged manner. FIG. 8 is a perspective view showing a part in the vicinity of the second circulation mechanism in the robot arm according to this embodiment in an enlarged view. In FIGS. 7 and 8, some of the elements are shown in a perspective manner in such a way that the structure of the second circulation mechanism is made clear.

As shown in FIGS. 7 and 8, the second circulation mechanism 7 includes a circulation path 60, a storage part 61, and an actuator (second actuator) 62. The circulation path 60 is a closed circuit formed by the second decelerator 15, a first hose 60*a*, the storage part 61, a second hose 60*b*, the actuator 62, and a third hose 60*c*, and the circulation path 60 is filled with lubricant.

One end part of the first hose 60*a* is connected to the second decelerator 15, and the other end part of the first hose 60*a* is connected to the storage part 61. One end part of the second hose 60*b* is connected to the storage part 61, and the other end part of the second hose 60*b* is connected to the actuator 62. One end part of the third hose 60*c* is connected to the actuator 62, and the other end part of the third hose 60*c* is connected to the second decelerator 15.

At this time, in order to prevent the first hose 60*a*, the second hose 60*b*, and the third hose 60*c* from being twisted, an end part of each of the first hose 60*a*, the second hose 60*b*, and the third hose 60*c* is preferably provided with a rotary coupling (not shown).

Since the structure of the storage part 61 is substantially equal to that of the storage part 51 of the first circulation mechanism 6, overlapping descriptions will be omitted. Note that, however, the storage part 61 is provided with a filter (not shown) for capturing the impurities in the lubricant in such a way as to cover the outlet of the storage part 61. This storage part 61 is, for example, preferably provided in such a way that it can be attached to or detached from the surface of the fixed arm 11*b* of the base part 2 on the X-axis positive side (i.e., the surface on the side opposite to the side of the fixed arm 11*b* of the base part 2 to which the first arm part 3 is connected).

The supply inlet to which the other end part of the first hose 60*a* in the storage part 61 is connected is also preferably formed at a position higher than the center of the height of the storage part 61 in the Z-axis direction. Further, the outlet to which one end part of the second hose 60*b* in the storage part 61 is connected is also preferably formed in the end part of the storage part 61 on the Z-axis positive side.

The actuator 62 circulates the lubricant inside the circulation path 60. The actuator 62 includes a piston pump 62*a* and a drive transmission mechanism 62*b*. The piston pump 62*a* is configured to push out the lubricant as a piston 62*d* moves in the Y-axis negative direction inside a cylinder 62*c*.

The cylinder 62*c* includes a cylindrical part having a diameter substantially equal to the diameter of the piston 62*d* formed inside therein, and this cylindrical part is substantially sealed. Then a supply inlet is formed in the vicinity of the end part of the cylinder 62*c* on the Y-axis positive side, and the other end part the second hose 60*b* is connected to this supply inlet. Further, an outlet is formed in the vicinity of the end part of the cylinder 62*c* on the Y-axis negative side, and one end part of the third hose 60*c* is connected to the outlet.

As shown in FIG. 8, a through-hole 62*e* is roughly fixed in the piston 62*d* in the Y-axis direction (i.e., a direction in which the piston 62*d* moves). Then the end part of a rod 62*f* on the Y-axis negative side is connected to the surface of the piston 62*d* on the Y-axis positive side. Further, the surface of the piston 62*d* on the Y-axis negative side is provided with a valve mechanism 62*g*.

The rod 62*f* is extended in the Y-axis direction, and the end part of the rod 62*f* on the Y-axis positive side is protruded from the cylinder 62*c*. The valve mechanism 62*g* opens the through-hole 62*e* when the piston 62*d* has moved in the Y-axis positive direction and closes the through-hole 62*e* when the piston 62*d* has moved in the Y-axis negative direction.

The valve mechanism 62*g* is, for example, a circular plate having a shape substantially equal to that of the surface of the piston 62*d* on the Y-axis negative side, and is connected to the surface of the piston 62*d* on the Y-axis negative side via a hinge (not shown). However, the valve mechanism 62*g* may be a typical check valve or the like.

The above piston pump 62*a* is fixed to the tip end part of the fixed arm 11*b* via a strut 63 in a state in which the piston pump 62*a* is arranged on the Z-axis positive side with respect to the fixed arm 11*b* of the second base 11 of the base part 2. However, the structure of the piston pump 62*a* is not limited to the above structure and the piston pump 62*a* may have any structure as long as the piston pump 62*a* is capable of pushing out the lubricant along with the movement of the piston 62*d*.

The drive transmission mechanism 62*b* transmits the rotation of the first arm part 3 with respect to the second base 11 to the rod 62*f* in order to use the rotation of the first arm part 3 with respect to the second base 11 of the base part 2 as a drive source of the piston pump 62*a*.

As shown in FIG. 8, the drive transmission mechanism 62*b* includes a rotation transmission part 62*h* and a rotated transmission part 62*i*. The rotation transmission part 62*h* includes a convex part 62*j* that is protruded in a radial direction about the second axis AX2, and this convex part 62*j* is fixed to the surface of the first arm part 3 on the X-axis positive side (i.e., the side in the first arm part 3 that is connected to the fixed arm 11*b* of the base part 2) via a coupling part 62*k* that is extended in the X-axis direction.

The rotated transmission part 62*i* includes a concave part 62*l* engaged with the convex part 62*j* of the rotation transmission part 62*h*, and is fixed to the end part of the rod 62*f* on the Y-axis positive side. However, the structure of the drive transmission mechanism 62*b* is not limited to the above structure and the drive transmission mechanism 62*b* may have any structure as long as it is able to transmit the rotation of the first arm part 3 with respect to the second base 11 of the base part 2 to the piston 62*d*.

Next, an operation of the first circulation mechanism 6 in the robot arm 1 according to this embodiment will be explained. When the second base 11 is rotated in one direction about the first axis AX1 with respect to the first base 10 of the base part 2, the roller 52*i* is rotated along the circumferential surface of the first base 10, as described above.

At this time, when the second base 11 is rotated in one direction with respect to the first base 10, the ratchet mechanism 52*j* is configured to transmit the rotation of the roller 52*i* to the transmission axis 52*h*. Therefore, the rotation of the roller 52*i* is transmitted to the screw 52*d* via the ratchet mechanism 52*j*, the transmission axis 52*h*, the second gear 52*g*, and the first gear 52*f*.

As described above, the first circulation mechanism 6 rotates the screw 52*d* using the rotation of the second base 11 with respect to the first base 10 of the base part 2 as a drive source, whereby it is possible to push out the lubricant, and in accordance therewith, to circulate the lubricant inside the circulation path 50.

At this time, the impurities in the lubricant are captured by the filter 56 of the storage part 51. Therefore, it is possible to prevent the lubricant from being degraded and to reduce the frequency of the replacement of the lubricant with a new one. In addition, it is possible to circulate the lubricant inside the first decelerator 13 and to distribute the lubricant between the gears of the first decelerator 13.

Further, since the first motor 12, the first decelerator 13, the storage part 51, and the actuator 52 are provided in the second base 11 of the base part 2 in this embodiment, it is possible to prevent the first hose 50*a*, the second hose 50*b*, and the third hose 50*c* from being twisted when the second base 11 is rotated with respect to the first base 10.

Also in a case in which the second base 11 is rotated in the other direction about the first axis AX1 with respect to the first base 10 of the base part 2, the roller 52*i* is rotated along the circumferential surface of the first base 10. However, when the second base 11 is rotated in the other direction with respect to the first base 10, the ratchet mechanism 52*j* interrupts the transmission of the rotation of the roller 52*i* to the transmission axis 52*h*. Therefore, the rotation of the roller 52*i* is not transmitted to the screw 52*d*. Accordingly, it is possible to prevent the lubricant from flowing back inside the circulation path 50.

However, when the first circulation mechanism 6 is able to circulate the lubricant inside the circulation path 50 also by the other rotation of the second base 11 with respect to the first base 10 of the base part 2, the ratchet mechanism 52*j* may not be provided.

Since the aforementioned first circulation mechanism 6 is configured to circulate the lubricant by one rotation of the roller 52*i*, it is suitable for a part such as the base part 2 where the rotation range is wide.

Next, an operation of the second circulation mechanism 7 in the robot arm 1 according to this embodiment will be explained. FIGS. 9 to 12 are diagrams for explaining the operation of the second circulation mechanism in the robot arm according to this embodiment. FIGS. 9 to 12 each show a cylinder in a perspective manner in such a way that the position of the piston of the second circulation mechanism is made clear. Further, in the following description, description will be given taking the state of the second circulation mechanism shown in FIGS. 9 to 12 as an example.

Figure 9:
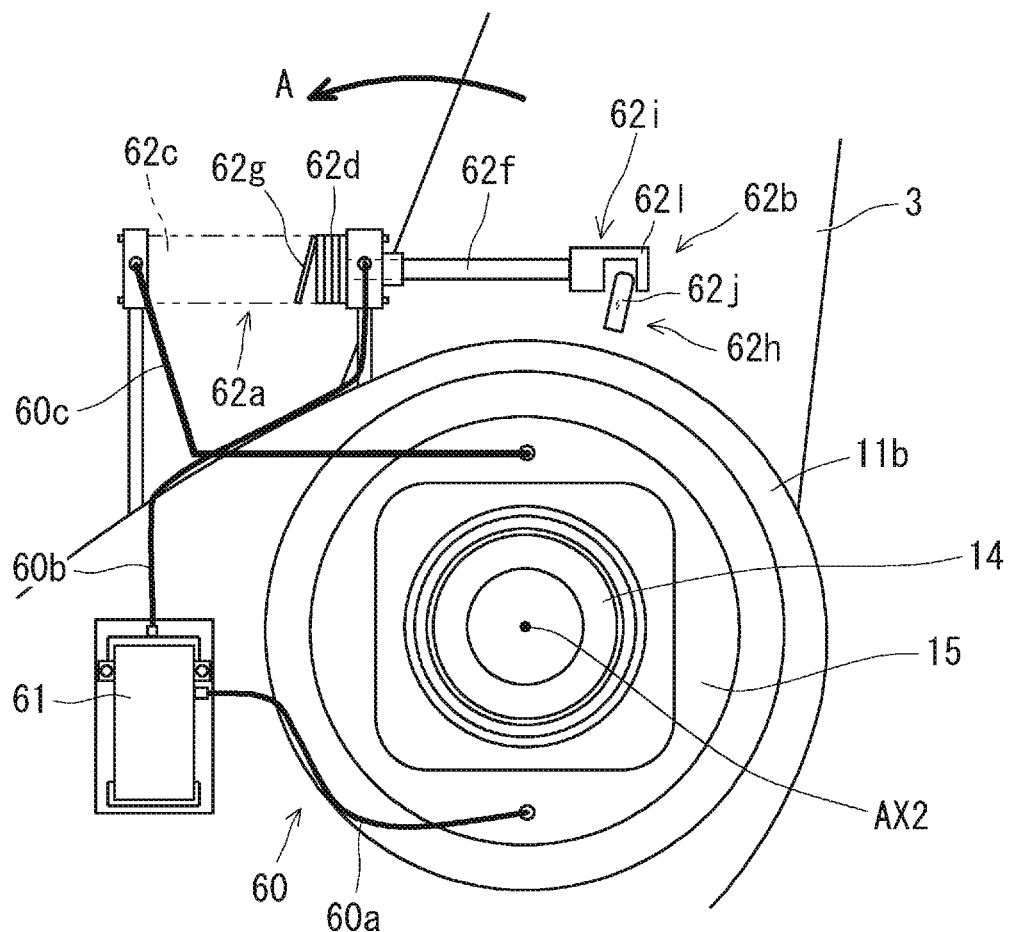
FIG. 9 is a diagram for describing an operation of the second circulation mechanism in the robot arm according to the embodiment.

As shown in FIG. 9, in a state in which the piston 62*d* is arranged on the Y-axis positive side, the concave part 62*l* of the rotated transmission part 62*i* provided in the fixed arm 11*b* of the base part 2 and the convex part 62*j* of the rotation transmission part 62*h* provided in the first arm part 3 are barely engaged with each other.

Figure 10:
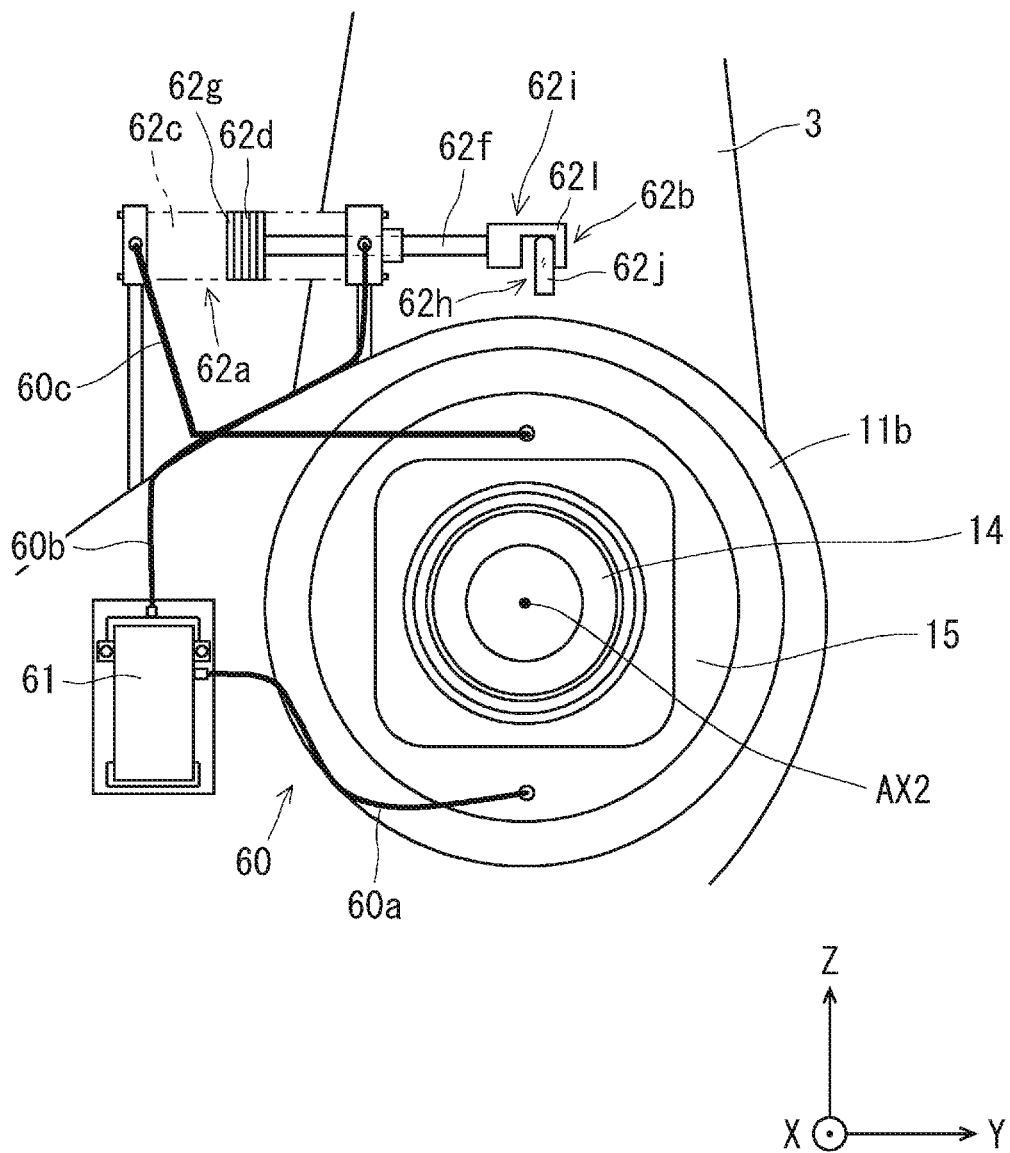
FIG. 10 is a diagram for describing an operation of the second circulation mechanism in the robot arm according to the embodiment.

When the first arm part 3 is rotated in the direction of an arrow A with respect to the fixed arm 11*b* of the base part 2 from this state, as shown in FIG. 10, the convex part 62*j* of the rotation transmission part 62*h* is rotated in the direction of the arrow A about the second axis AX2. As a result, the rotation of the first arm part 3 with respect to the fixed arm 11*b* is transmitted to the rotated transmission part 62*i* via the rotation transmission part 62*h*, and the piston 62*d* is pushed in the Y-axis negative direction.

Figure 11:
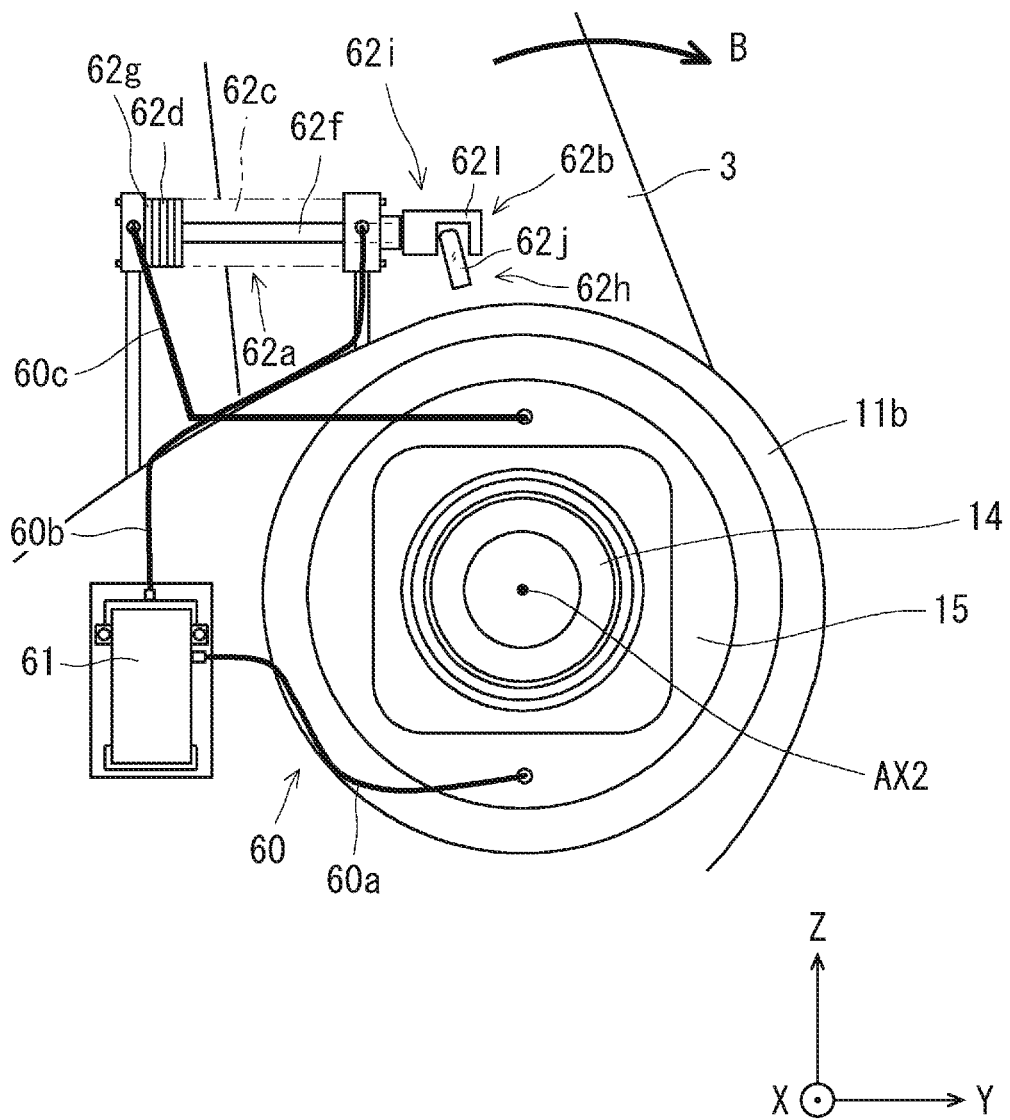
FIG. 11 is a diagram for describing an operation of the second circulation mechanism in the robot arm according to the embodiment.

When the first arm part 3 is further rotated in the direction of the arrow A with respect to the fixed arm 11*b* of the base part 2, as shown in FIG. 11, the convex part 62*j* of the rotation transmission part 62*h* is rotated in the direction of the arrow A about the second axis AX2. As a result, the rotation of the first arm part 3 with respect to the fixed arm 11*b* is transmitted to the rotated transmission part 62*i* via the rotation transmission part 62*h*, the piston 62*d* is pushed in the Y-axis negative direction, and the piston 62*d* is arranged in the most negative side of the Y axis. At this time, the convex part 62*j* of the rotation transmission part 62*h* and the concave part 62*l* of the rotated transmission part 62*i* are barely engaged with each other.

When the piston 62*d* is pushed in the Y-axis negative direction, the valve mechanism 62*g* is pushed into and rotated in such a way that it closely contacts the surface of the piston 62*d* on the Y-axis negative side, and blocks the through-hole 62*e* by the lubricant arranged on the Y-axis negative side with respect to the piston 62*d* in the cylinder 62*c* when the piston 62*d* moves in the Y-axis negative direction, whereby the lubricant arranged on the Y-axis negative side with respect to the piston 62*d* in the cylinder 62*c* is pushed out in the Y-axis negative direction.

On the other hand, when the first arm part 3 is rotated in the direction of an arrow B with respect to the fixed arm 11*b* of the base part 2, the convex part 62*j* of the rotation transmission part 62*h* is rotated in the direction of the arrow B about the second axis AX2. As a result, the rotation of the first arm part 3 with respect to the fixed arm 11*b* is transmitted to the rotated transmission part 62*i* via the rotation transmission part 62*h*.

At this time, when the piston 62*d* moves in the Y-axis positive direction, the lubricant arranged on the Y-axis positive side with respect to the piston 62*d* in the cylinder 62*c* passes through the through-hole 62*e* to rotate the valve mechanism 62*g* in such a way that it moves away from the surface of the piston 62*d* on the Y-axis negative side. Accordingly, the valve mechanism 62*g* opens the through-hole 62e, and the piston 62d is pushed in the Y-axis positive direction without being distributed by the lubricant arranged on the Y-axis positive side with respect to the piston 62d in the cylinder 62c. Further, since the lubricant is not pushed out in the Y-axis positive direction by the piston 62d, it is possible to prevent the lubricant from flowing back inside the circulation path 60.

Figure 12:
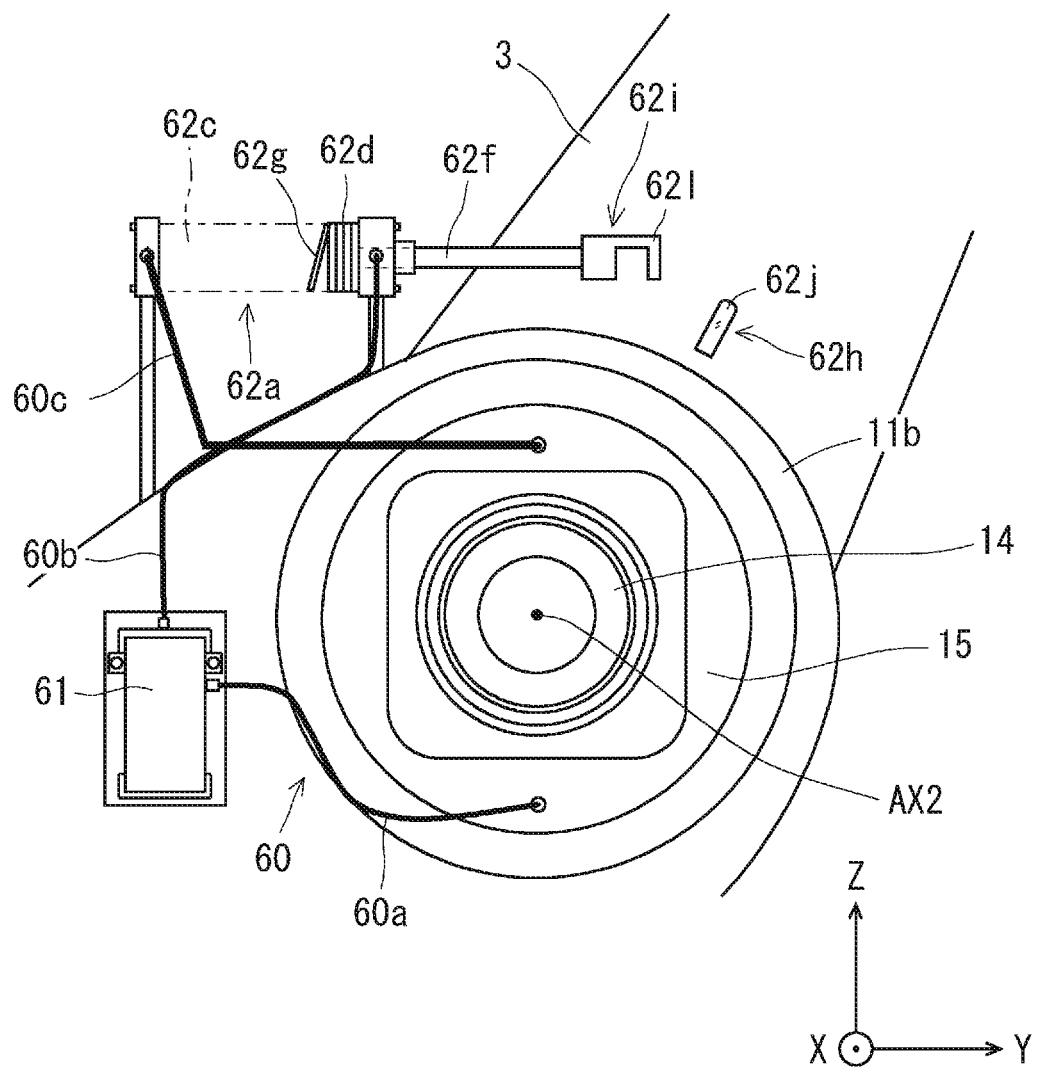
FIG. 12 is a diagram for describing an operation of the second circulation mechanism in the robot arm according to the embodiment.

When the first arm part 3 is further rotated in the direction of the arrow B with respect to the fixed arm 11b of the base part 2 and the convex part 62j of the rotation transmission part 62h is rotated in the direction of the arrow B about the second axis AX2 from the state in which the piston 62d is arranged in the most positive side of the Y axis as shown in FIG. 9, the state in which the convex part 62j of the rotation transmission part 62h and the concave part 62l of the rotated transmission part 62i are engaged with each other is cancelled, as shown in FIG. 12. Accordingly, it is possible to prevent the piston 62d from strongly pushed against the cylinder 62c and the piston 62d from being damaged.

On the other hand, when the first arm part 3 is rotated in the direction of the arrow A with respect to the fixed arm 11b of the base part 2 from the state shown in FIG. 12 and the convex part 62j of the rotation transmission part 62h is rotated in the direction of the arrow A about the second axis AX2, as shown in FIG. 9, the convex part 62j of the rotation transmission part 62h and the concave part 62l of the rotated transmission part 62i are engaged with each other again. Accordingly, it becomes possible to transmit the rotation of the first arm part 3 with respect to the fixed arm 11b of the base part 2 to the piston 62d again.

Since the operations of engaging and disengaging the convex part 62j of the rotation transmission part 62h with and from the concave part 62l of the rotated transmission part 62i in the state in which the piston 62d is arranged in the most negative side of the Y axis are similar to the operations of engaging and disengaging the convex part 62j of the rotation transmission part 62h with and from the concave part 62l of the rotated transmission part 62i in the aforementioned state in which the piston 62d is arranged in the most positive side of the Y axis, overlapping descriptions thereof will be omitted. In this state as well, it is possible to prevent the piston 62d from strongly pushed against the cylinder 62c and the piston 62d from being damaged.

That is, the convex part 62j of the rotation transmission part 62h according to this embodiment is configured to be fallen out from the concave part 62l of the rotated transmission part 62i when the rotation of the first arm part 3 with respect to the fixed arm 11b of the base part 2 falls outside a predetermined rotation range (i.e., the rotation range of the first arm part 3 from the state in which the piston 62d is arranged in the most positive side of the Y axis in the cylinder 62c to the state in which the piston 62d is arranged in the most negative side of the Y axis). However, while the convex part is provided in the rotation transmission part 62h and the concave part is provided in the rotated transmission part 62i in this embodiment, the convex part may be provided in the rotated transmission part 62i and the concave part may be provided in the rotation transmission part 62h.

As described above, the second circulation mechanism 7 reciprocates the piston 62d using the rotation of the first arm part 3 with respect to the fixed arm 11b of the base part 2 as a drive source, whereby it is possible to circulate the lubricant inside the second circulation path 60.

At this time, the impurities in the lubricant are captured by the filter of the storage part 61. Therefore, it is possible to prevent the lubricant from being degraded and to reduce the frequency of the replacement of the lubricant with a new one. In addition, it is possible to circulate the lubricant inside the second decelerator 15 and to distribute the lubricant between the gears of the second decelerator 15.

Further, since the second motor 14, the second decelerator 15, the storage part 61, and the piston pump 62a are provided in the second base 11 of the base part 2 in this embodiment, it is possible to prevent the first hose 60a, the second hose 60b, and the third hose 60c from being twisted when the first arm part 3 is rotated with respect to the second base 11.

Since the above second circulation mechanism 7 is configured to circulate lubricant by reciprocating the piston 62d, it is suitable for a part such as a joint part of the arm part in which a turning range is narrow.

Next, a flow of removing the impurities captured by the filter 56 of the storage part 51 in the robot arm 1 according to this embodiment will be explained. Since the structure of the storage part 51 is substantially equal to that of the storage part 61, only the flow of removing the impurities captured by the filter 56 of the storage part 51 will be representatively explained.

For example, every time a predetermined period passes, while the robot arm 1 is being stopped, as shown in FIG. 5, the other end part of the first hose 50a is detached from the first nipple 51c of the storage part 51, one end part of the second hose 50b is detached from the second nipple 51e of the storage part 51, and these ends are connected to each other and short-circuited. Then, by detaching the storage part 51 from the connection plate 54, the impurities captured by the filter 56 can be easily eliminated along with the lubricant in the storage part 51.

Note that the storage part 51 itself may be replaced with a new one. Further, the other end part of the first hose 50a and one end part of the second hose 50b may be blocked by using a clip without short-circuiting the first hose 50a and the second hose 50b.

On the other hand, by attaching the storage part 51 to the connection plate 54, connecting the other end part of the first hose 50a to the first nipple 51c of the storage part 51, connecting one end part of the second hose 50b to the second nipple 51e of the storage part 51, and feeding lubricant, the lubricant is ready to be circulated again.

At this time, if the outlet 51d of the storage part 51 is formed in the end part of the storage part 51 on the Z-axis positive side and the filter 56 is fixed on the inner wall surface of the storage part 51 in such a way that it covers the outlet 51d from the inside direction of the storage part 51, the impurities captured by the filter 56 can be precipitated in the bottom part of the storage part 51 while the robot arm 1 is being stopped. When the supply inlet 51b of the storage part 51 is formed at a position higher than the center of the height of the storage part 51 in the Z-axis direction, it is possible to circulate the lubricant inside the circulation path 50 without the impurities precipitated in the bottom part of the storage part 51 being blown upwards. Accordingly, it is possible to prevent the filter 56 from being clogged.

The robot art 1 having the aforementioned structure is able to capture impurities in the lubricant of the first decelerator 13 and the second decelerator 15. Therefore, it is possible to prevent the lubricant of the first decelerator 13 and the second decelerator 15 from being degraded, and to reduce the frequency of the replacement of the lubricant of the first decelerator 13 and the second decelerator 15 with a new one. As a result, it is possible to at least reduce the stop time for replacing the lubricant of the first decelerator 13 and the second decelerator 15, whereby it is possible to improve productivity of the robot arm 1.

Moreover, it is possible to circulate the lubricant of the first decelerator 13 and the second decelerator 15 and to distribute the lubricant between the gears of the first decelerator 13 and the second decelerator 15, whereby it is possible to prevent the first decelerator 13 and the second decelerator 15 from being damaged.

Further, since a drive source such as a dedicated motor for circulating the lubricant of the first decelerator 13 and the second decelerator 15 is not required, it is possible to prevent the size of the robot arm 1 from being increased.

Further, the robot arm 1 according to this embodiment appropriately selects the actuator 52 or the actuator 62 in accordance with the rotation range of the second base 11 with respect to the first base 10 of the base part 2 and the rotation range of the first arm part 3 with respect to the fixed arm 11b of the second base 11. Therefore, it is possible to definitely circulate the lubricant of the first decelerator 13 and the second decelerator 15. Further, since the size of the piston pump 62a can be reduced compared to that of the screw pump 52a, for example, it is possible to prevent the robot arm 1 from being increased by using the second circulation mechanism 7 as the wrist mechanism 5 and the like.

The present disclosure is not limited to the aforementioned embodiment and may be changed as appropriate without departing from the spirit of the present disclosure.

For example, while the robot arm 1 according to the aforementioned embodiment is a six-axis articulated robot, it is sufficient that at least the first member and the second member be connected to each other via a decelerator.

For example, while the robot arm 1 according to the aforementioned embodiment includes the first circulation mechanism 6 and the second circulation mechanism 7, it is sufficient that this robot arm 1 enable lubricant of at least one decelerator of the robot arm 1 to be circulated. Further, as a matter of course, the robot arm 1 may be configured in such a way that the lubricant of all the decelerators of the robot arm 1 can be circulated.

For example, while at least the peripheral surface of the part of the Z-axis positive side of the first base 10 of the base part 2 according to the aforementioned embodiment is formed on a circumferential surface, it is sufficient that at least a part thereof is an arc surface. In this case, it is sufficient that the roller 52i be rotated along the arc surface.

For example, while the screw pump 52a or the piston pump 62a is used in the aforementioned embodiment, it is sufficient that the lubricant of the decelerator be pushed out using the rotation of the second member with respect to the first member as a drive source, and a gear pump or the like may instead be used.

For example, while the actuator 52 is fixed to the peripheral surface of the second base 11 of the base part 2 in the aforementioned embodiment, it is sufficient that the actuator 52 be fixed to the second base 11 in such a way that the roller 52i can be rotated along the circumferential surface of the first base 10 of the base part 2.

For example, while the storage part 51 and the actuator 52 are fixed to the second base 11 of the base part 2 in the aforementioned embodiment, the storage part 51 and the actuator 52 may be fixed to the first base 10 of the base part 2. Further, while the storage part 61 and a part of the actuator 62 that excludes the rotation transmission part 62h are fixed to the fixed arm 11b of the base part 2 in the aforementioned embodiment, the storage part 61 and a part of the actuator 62 that excludes the rotation transmission part 62h may be fixed to the first arm part 3 and the rotation transmission part 62h may be fixed to the fixed arm 11b of the base part 2.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A robot arm, comprising:
   a second member rotationally coupled to a first member via a decelerator that accommodates lubricant therein;
   a circulation path in which the lubricant is circulated via the decelerator;
   a storage part that is arranged externally from the decelerator in the circulation path and stores the lubricant; and
   an actuator configured to circulate the lubricant in the circulation path,
   wherein the storage part includes an inlet and an outlet for the lubricant, and a filter covers the outlet so as to capture impurities in the lubricant as the lubricant flows through the filter and the outlet,
   the actuator comprises a piston pump that pushes out the lubricant, a piston included in the piston pump moving using the rotation of the second member with respect to the first member as a drive source,
   the piston pump comprises a cylinder that accommodates the piston in such a way the piston can be moved and is arranged in the circulation path, and a rod having one end part fixed to the piston and having an other end part protruded from the cylinder, the cylinder being fixed to the first member,
   the actuator comprises:
      a rotation transmission part that is rotated about a rotation axis of the second member when the second member is rotated with respect to the first member and includes one of a convex part and a concave part; and
      a rotated transmission part that is fixed to the other end part of the rod and includes the other one of the convex part and the concave part with which the rotation transmission part is engaged, and
   the convex part falls out of the concave part when the rotation of the second member with respect to the first member falls outside a predetermined rotation range.

2. The robot arm according to claim 1, wherein
   the outlet of the lubricant in the storage part is formed in an end part on a side opposite to a gravity direction in the storage part, and
   the filter is fixed to the end part on the side opposite to the gravity direction in the storage part in such a way that the filter covers the outlet from an inside direction of the storage part.

3. The robot arm according to claim 1, wherein the actuator pushes out the lubricant using the rotation of the second member with respect to the first member as a drive source.

4. A robot arm in which a second member is rotationally coupled to a first member via a decelerator that accommodates lubricant therein, the robot arm comprising:
   a circulation path in which the lubricant is circulated via the decelerator;
   a storage part that is arranged in the circulation path and stores the lubricant; and
   an actuator configured to circulate the lubricant, wherein the storage part is provided with a filter for capturing impurities in the lubricant in such a way that the filter covers an outlet of the lubricant in the storage part, wherein the actuator comprises a screw pump that pushes out the lubricant, a screw included in the screw pump being rotated using the rotation of the second member with respect to the first member as a drive source.

5. The robot arm according to claim 4, wherein the actuator comprises a ratchet mechanism that transmits one rotation of the second member with respect to the first member to the screw and interrupts transmission of another rotation of the second member with respect to the first member to the screw.

6. The robot arm according to claim 1, wherein the actuator comprises:
   a through-hole that penetrates through the piston; and
   a valve mechanism configured to open the through-hole when the second member is rotated in one direction with respect to the first member and the piston is moved and to block the through-hole when the second member is rotated in another direction with respect to the first member and the piston is moved.

7. A robot arm in which a second member is rotationally coupled to a first member via a decelerator that accommodates lubricant therein, the robot arm comprising:
   a circulation path in which the lubricant is circulated via the decelerator;
   a storage part that is arranged in the circulation path and stores the lubricant; and
   an actuator configured to circulate the lubricant;
   wherein the storage part is provided with a filter for capturing impurities in the lubricant in such a way that the filter covers an outlet of the lubricant in the storage part,
   a first base having a peripheral surface in which an arc surface is provided, the first base being the first member;
   a second base that is rotationally connected to the first base about a first axis that passes the center of the arc surface of the first base, the second base being the second member;
   an arm part connected to the second base in such a way that it can be rotated about a second axis perpendicular to the first axis;
   wherein the actuator comprises a first actuator and a second actuator;
   the first actuator comprises a screw pump fixed to the second base and a roller that is connected to the screw pump and contacts an arc surface of the first base, the first actuator being capable of transmitting the rotation of the second base with respect to the first base to the screw pump via the roller;
   the second actuator comprises a piston pump fixed to the second base, a rotation transmission part that is fixed to the arm part and includes one of a convex part and a concave part, and a rotated transmission part that is fixed to a tip end part of a rod of the piston pump and includes the other one of the convex part and the concave part that can be engaged with the rotation transmission part, the second actuator being capable of transmitting the rotation of the arm part with respect to the second base to the piston pump via the rotation transmission part and the rotated transmission part, and
   wherein the second base is provided with a first motor and a first decelerator for rotating the second base with respect to the first base and a second motor and a second decelerator for rotating the arm part with respect to the second base.

8. The robot arm according to claim 1, wherein the storage part has a hollow-box shape including a lid, and the storage part is fixed to an outer surface of the second member in such a way that it can be attached and detached from the second member.

* * * * *